(12) United States Patent
Heutschi

(10) Patent No.: US 7,706,791 B2
(45) Date of Patent: Apr. 27, 2010

(54) METHOD FOR TELECOMMUNICATION, IDENTIFICATION MODULE AND COMPUTERIZED SERVICE UNIT

(75) Inventor: Walter Heutschi, Jegenstorf (CH)

(73) Assignee: TOGEWA Holding AG, Bern (CH)

( * ) Notice: Subject to any disclaimer, the term of this patent is extended or adjusted under 35 U.S.C. 154(b) by 1725 days.

(21) Appl. No.: 10/483,079

(22) PCT Filed: Jul. 18, 2001

(86) PCT No.: PCT/CH01/00449

§ 371 (c)(1),
(2), (4) Date: Jan. 8, 2004

(87) PCT Pub. No.: WO03/009623

PCT Pub. Date: Jan. 30, 2003

(65) Prior Publication Data
US 2004/0176092 A1   Sep. 9, 2004

(51) Int. Cl.
*H04W 4/00* (2009.01)
(52) U.S. Cl. ............... 455/435.1; 455/433; 455/432.1; 455/558; 370/352; 370/401
(58) Field of Classification Search ............. 455/432.1, 455/432.3, 435.1, 433, 558, 406, 552.1; 370/352, 335, 401
See application file for complete search history.

(56) References Cited

U.S. PATENT DOCUMENTS

| | | | | |
|---|---|---|---|---|
| 5,600,705 | A * | 2/1997 | Maenpaa ..................... | 455/433 |
| 5,862,481 | A * | 1/1999 | Kulkarni et al. ........... | 455/432.2 |
| 5,920,814 | A * | 7/1999 | Sawyer et al. ............ | 455/422.1 |
| 6,029,067 | A * | 2/2000 | Pfundstein ................ | 455/426.1 |
| 6,453,162 | B1 * | 9/2002 | Gentry ...................... | 455/433 |
| 6,519,242 | B1 * | 2/2003 | Emery et al. ................ | 370/338 |
| 6,546,246 | B1 * | 4/2003 | Bridges et al. ........... | 455/432.1 |
| 6,603,968 | B2 * | 8/2003 | Anvekar et al. ............. | 455/433 |
| 6,738,622 | B1 * | 5/2004 | Stadelmann et al. ...... | 455/435.1 |
| 6,836,477 | B1 * | 12/2004 | West et al. ................... | 370/352 |
| 6,892,070 | B2 * | 5/2005 | Warrier et al. ........... | 455/432.1 |
| 6,937,862 | B2 * | 8/2005 | Back et al. .................. | 455/445 |

(Continued)

FOREIGN PATENT DOCUMENTS

DE   198 28 735 A1   12/1999

(Continued)

OTHER PUBLICATIONS

G. Mazziotto, "The Subscriber Identity Module for the European Digital Cellular System GSM", Jun. 26, 1990, pp. 1-9.

*Primary Examiner*—Sharad Rampuria
(74) *Attorney, Agent, or Firm*—Oblon, Spivak, McClelland, Maier & Neustadt, L.L.P.

(57) ABSTRACT

A subscriber, who logs into a visited communication network (VPMN), in particular a mobile network, by means of his communication terminal (2) and his identification module (SIM) connected thereto, is transmitted, automatically or upon request, (S1) a subscriber identification (IMSI-P) from the number range of the visited communication network (VPMN) (S2). The received subscriber identification (IMSI-P) from the number range of the visited communication network (VPMN) is stored and activated in the identification module (SIM) of the subscriber. The subscriber can afterwards log into the visited communication network (VPMN) as a local subscriber.

15 Claims, 1 Drawing Sheet

U.S. PATENT DOCUMENTS

| | | | |
|---|---|---|---|
| 7,035,239 B2 * | 4/2006 | McCann et al. | 370/335 |
| 7,089,001 B2 * | 8/2006 | Leung et al. | 455/433 |
| 7,450,565 B2 * | 11/2008 | Suotula et al. | 370/352 |
| 2001/0029182 A1 * | 10/2001 | McCann et al. | 455/433 |

FOREIGN PATENT DOCUMENTS

| | | |
|---|---|---|
| DE | 198 29 797 A1 | 1/2000 |
| EP | 0 562 890 A1 | 9/1993 |
| EP | 0 592 890 A1 | 4/1994 |
| EP | 0 730 387 A1 | 9/1996 |
| EP | 0 748 135 A3 | 12/1996 |
| EP | 0 859 531 A3 | 8/1998 |
| EP | 0 990 364 B1 | 4/2000 |
| EP | 1 001 639 A1 | 5/2000 |
| WO | WO 89/07380 | 8/1989 |
| WO | WO 92/19078 | 10/1992 |
| WO | WO 98/10614 | 3/1998 |
| WO | WO 98/24257 | 6/1998 |
| WO | WO 98/38817 | 9/1998 |
| WO | WO 99/55107 | 10/1999 |
| WO | WO 00/41409 | 7/2000 |
| WO | WO 00/49820 | 8/2000 |

* cited by examiner

METHOD FOR TELECOMMUNICATION, IDENTIFICATION MODULE AND COMPUTERIZED SERVICE UNIT

The present invention relates to a telecommunication method as well as an identification module suitable therefor and a computerized service unit suitable therefor. The invention relates in particular to a telecommunication method for logging a subscriber into a visited partner communication network, in particular a mobile radio network, an identification module, in which a subscriber identification outside the number range of the visited partner communication network is stored, being connected to the communication terminal of the subscriber.

BACKGROUND ART

In the field of mobile radio telephony, understood by the term "roaming" is the operation of a mobile communication terminal, for example a mobile radio telephone or a portable computer with corresponding mobile radio components, outside the home network. Roaming is used for instance between different GSM networks (Global System for Mobile Communication) or UMTS networks (Universal Mobile Telephone System), but also between mobile radio networks which work according to different standards. To enable the direct roaming of a subscriber between two mobile radio networks, roaming agreements have to be concluded between the respective operators of the mobile radio networks. In a visited mobile radio network (Visited Public Mobile Network, VPMN), a subscriber is registered in a visitor register (Visitor Location Register, VLR) using his subscriber identification (International Mobile Subscriber Identity, IMSI) from the number range of his home mobile radio network (Home Public Mobile Network, HPMN), and his location is stored in a home register (Home Location Register, HLR) of the home mobile radio network, i.e. a so-called location update is carried out.

Described in the patent application WO 98/10614 is a telecommunication method for indirect roaming enabling a subscriber of a home mobile radio network to connect to a visited mobile radio network without a roaming agreement with the home mobile radio network, the connection being achieved through means, for example a subscriber identification (IMSI) and a call number (MSISDN=Mobile Subscriber Integrated Services Digital Network), which are made available by a partner network having a roaming agreement, on the one hand, with the home mobile radio network and, on the other hand, with the visited mobile radio network.

In the method described in WO 98/10614, each identification module of the subscriber of the home mobile radio network contains two permanently stored subscriber identifications. A different call number is assigned to each subscriber identification. The first subscriber identification belongs to the number range of the home mobile radio network, the second to the number range of the partner network. In order to register in a visited network that does not have any roaming agreement with the home mobile radio network, the subscriber can deactivate the first subscriber identification from the home mobile radio network and activate the second subscriber identification from the partner network, and is thereby regarded in the visited network as a subscriber of the partner network; thus a roaming process for the visited network can be carried out via the partner network.

Since in the method according to WO 98/10614 each subscriber identification is assigned another, different call number, the calls with the first number for the subscriber have to be redirected with a complex and time-consuming mechanism. Subscriber-specific data, for example redirections of calls, additional numbers, etc. are moreover assigned to the subscriber identification in a completely conventional way and are thus only available in the home mobile radio network or in visited mobile radio networks having a roaming agreement with the home mobile radio network.

Described in the patent publication EP 0 990 364 is a telecommunication method for indirect roaming similar to that in WO 98/10614. According to EP 0 990 364, however, a common call number is assigned to the first subscriber identification of the home mobile radio network and to the second subscriber identification of the partner network.

Both the conventional standardized method for direct roaming as well as the above-described method for indirect roaming have the disadvantage that the subscriber is logged into the visited mobile radio network as a foreign subscriber and has to pay significantly higher connection fees than a local subscriber. Additional costs can also arise in particular when two subscribers from the same home mobile radio network who are located in a common visited mobile radio network communicate with each other and the connection thereby is generated via the home mobile radio network.

DISCLOSURE OF INVENTION

It is the object of the present invention to propose a telecommunication method for logging a subscriber into a visited partner communication network as well as devices suitable for this telecommunication method which avoid the drawbacks of the state of the art.

These objects are achieved according to the present invention through the elements of the independent claims. Further preferred embodiments follow moreover from the dependent claims and from the specification.

A subscriber has an identification module connectible to a communication terminal, in which identification module a first subscriber identification is stored which lies in the number range of the home network operator of the subscriber or in the number range of a service provider who offers services of a virtual communication network. Typically, such a service provider of a virtual network has an assigned number range for subscriber identifications, but does not have at his disposal, however, any communication network of his own and/or, in the case of a mobile radio network, has no license for transmission frequencies. The home network operator, or respectively the service provider of a virtual network, has a partnership agreement with the operator of a partner communication network, in the case of a mobile radio network, e.g. a kind of roaming agreement. The subscriber visits the partner communication network with his communication terminal which is connected to the identification module. When switching on the communication terminal in the visited partner communication network, a roaming process is initiated in a conventional way and a location update is carried out, since the subscriber identification stored in the identification module lies outside the number range of the visited partner communication network.

The above-mentioned objects are achieved through the invention in particular in that a second subscriber identification from the number range of the visited partner communication network is transmitted from a computerized service unit to the communication terminal in the visited partner communication network, the second participant identification is stored and activated in the identification module connected to the communication terminal, and the subscriber is logged into the visited partner communication network using the second subscriber identification. The advantage of the transmission of the second subscriber identification to the communication terminal in the visited partner communication network is that the subscriber can thereby be turned into a local subscriber of the visited partner communication network dynamically in any partner communication network since the second subscriber identification lies in the number range of the visited partner communication network.

Preferably subscriber identifications from the number range of partner communication networks are stored in a database of the service unit, a data message with a service request for the second subscriber identification is transmitted from the communication terminal in the visited partner communication network via the visited partner communication network to the service unit, and the second subscriber identification is taken from the database on the basis of the received service request and is transmitted via the visited partner communication network to the requesting communication terminal. Through the transmission of the service request from the communication terminal to the service unit, the transmission of a second subscriber identification from the number range of the visited partner communication network can be initiated at selectable times, for instance at the initiative of the subscriber.

In a preferred embodiment variant, the first subscriber identification is selected from the number range of the operator of the service unit, the first subscriber identification is stored, assigned to a call number, in a home register of the service unit, and the second subscriber identification is linked in the service unit to that call number which is assigned to the first subscriber identification. Through the selection of the first subscriber identification from the number range of the operator of the service unit and through the storing of the first subscriber identification in a home register of the service unit, it is made possible for subscribers to whom a first subscriber identification has been assigned in each case from the number range of the operator of the service unit to be recognized internationally as a subscriber of this operator and for location updates to be transmitted to the home register of the operator when logging into partner communication networks, without it being necessary for the operator himself to have communication networks at his disposal, but instead being able to be merely a service provider of a virtual network. Through the linking of the first and second subscriber identifications with a common call number it is made possible for the subscriber to be able to be reached with the same call number in all partner communication networks in which he is logged in. This applies not only to mobile radio networks, but in particular also to fixed networks in which the subscriber can log in by means of a subscriber identification.

In an embodiment variant, cost data are transmitted from the visited partner communication network to a service unit of the operator identified through the first subscriber identification for billing.

In a preferred embodiment variant, a mobile communication terminal is used, a mobile radio network is selected as the visited partner communication network, and mobile subscriber identifications are used as first and second subscriber identifications.

BRIEF DESCRIPTION OF DRAWINGS

An embodiment of the present invention is described in the following with reference to an example. The example of the embodiment is illustrated by the following sole attached figure.

MODES FOR CARRYING OUT THE INVENTION

Figure 1:
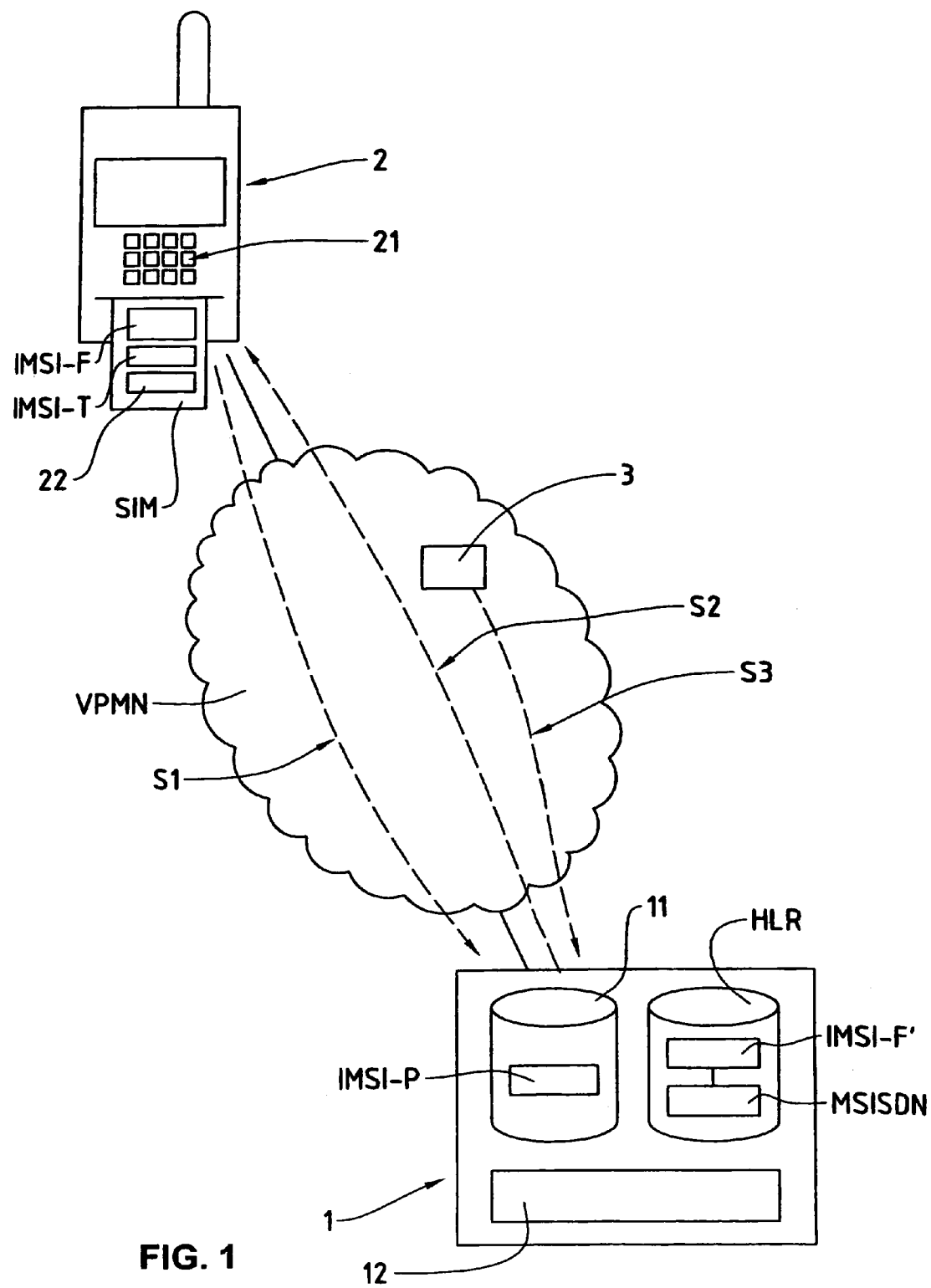
FIG. 1 shows a block diagram illustrating schematically a communication terminal and a computerized service unit which exchange data via a communication network.

In FIG. 1, the reference numeral 2 refers to a communication terminal. The communication terminal 2 is preferably a mobile radio device, for example a mobile radio telephone or portable laptop or palmtop computer with mobile radio components. The communication terminal 2 could also be set up for connection to a fixed network, however, in particular a digital fixed network, in which subscribers can be logged in with subscriber identifications, for instance an ISDN network (Integrated Services Digital Network), an IP network (Internet Protocol) or a WLAN (Wireless Local Area Network) or WAN (Wide Area Network).

As is shown schematically in FIG. 1, the communication terminal 2 is connected to an identification module SIM. The identification module SIM is removably connected to the communication terminal 2 via an interface having contacts, and comprises memory elements, for storing data elements, as well as a programmable processor and a programmed software module 22, based for instance on the SIM toolkit or on Java (Java is a registered trademark of the company Sun Microsystems Inc.). The functions of the processor and of the programmed software module 22 can also be implemented by means of circuits programmed in a fixed way. The identification module SIM is preferably an SIM card (Subscriber Identification Module) in the form of a chipcard. A subscriber identification IMSI-F is stored permanently and in a write-protected way in the identification element SIM.

In FIG. 1, the reference symbol VPMN refers to a communication network, preferably a mobile radio network, for example a GSM network (Global System for Mobile Communication) or a UMTS network (Universal Mobile Telephone System) or another terrestrial or satellite-based mobile radio network. As already mentioned, the communication network VPMN could also be a fixed network in which subscribers can log in by means of subscriber identifications.

The subscriber identifications are preferably internationally valid subscriber identifications, which are typically structured hierarchically. The subscriber identifications are preferably mobile subscriber identifications, for instance so-called International Mobile Subscriber Identity (IMSI) numbers. In the norm GSM 03.03 of the European Telecommunications Standards Institute (ETSI), for example, the IMSI numbers are defined in fifteen symbols, whereby (as shown in the following Table 1) the first three symbols form the country code (Mobile Country Code, MCC), the following one or two symbols form the network code (Mobile Network Code, MNC) and the subsequent ten or eleven symbols form the subscriber code (Mobile Subscriber Identification Number, MSIN). The first symbols of the subscriber code identify the home register (Home Location Register, HLR) in which the data for the respective subscriber are stored.

TABLE 1

| MCC | MNC | MSIN |
| --- | --- | --- |

The licensed operator of the communication network VPMN can thus be assigned a number range within which the subscriber identifications for the communication network VPMN can be allocated. On the basis of the subscriber identification, furthermore, the affiliation of the respective subscriber with a communication network, or respectively with its operator, can be determined.

In FIG. 1, the reference numeral 1 refers to a computerized service unit which is connected to the communication network VPMN. Typically, the service unit 1 is not connected directly to the communication network VPMN, but instead via connecting networks and/or switching centers. The service unit 1 comprises one or more computers, a programmed software module 12, a database 11 and preferably a home register HLR, which are implemented on the computer or computers. Stored in the home register HLR are subscriber identifications IMSI-F' of subscribers who can thereby identify themselves for services of the service unit 1. As is shown schematically in FIG. 1, the subscriber identifications IMSI-F' are each assigned a call number MSISDN in the home register HLR. Stored in the database 11 are subscriber identifications IMSI-P from the number range of partner communication networks, for instance the communication network VPMN. These subscriber identifications IMSI-P are assigned to the operator of the service unit 1 on the basis of partnership agreements with operators of partner communication networks, for example as number range or set of individual numbers.

When the subscriber, with his communication terminal 2 and the identification module SIM connected thereto, visits the communication network VPMN, the IMSI-F, stored permanently in the identification module SIM, is transmitted to the visited communication network VPMN upon activation of the communication terminal 2. The subscriber identification IMSI-F is preferably from the number range of the operator of the service unit 1, where it is stored in the home register HLR. The subscriber identification IMSI-F, however, could also be from the number range of a network different from the visited communication network VPMN and be stored in the home register of this other network. Since the subscriber identification IMSI-F is not from the number range of the visited communication network VPMN, a conventional roaming process is initiated. The subscriber identification IMSI-F is thereby stored in a visitor register (not shown) (Visitor Location Register, VLR) of the visited communication network VPMN and a so-called Location Update is carried out, whereby the location of the visiting subscriber is transmitted to the home register identified by the IMSI-F, for example to the home register HLR in the service unit 1.

As shown in FIG. 1, in a first step S1, a service request for a subscriber identification from the number range of the visited communication network VPMN is transmitted from the communication terminal 2 via the communication network VPMN to the service unit 1. This service request is transmitted by means of a data message, for instance an SMS message (Short Message Service) or a USSD message (Unstructured Supplementary Services Data). The data message is generated by the programmed software module 22, for instance after actuation of a predefined function key, or it is entered by the user by means of the operating elements 21.

The data message with the service request is received and analysed in the service unit 1 by the software module 12. On the basis of the received data message, the software module 12 can determine the communication network VPMN visited by the subscriber, and take from the database 11 a corresponding subscriber identification IMSI-P from the number range of the visited communication network VPMN, and, in step S2, transmit it to the communication terminal 2, for example in a data message, as was indicated above for the service request. If the subscriber identification IMSI-F of the requesting subscriber is registered in the home register HLR of the service unit 1, the software module 12 establishes in addition a link of the assigned subscriber identification IMSI-P to the call number MSISDN which is assigned to the subscriber identification IMSI-F of the requesting subscriber in the home register HLR. The subscriber can thereby be reached in all visited partner communication networks VPMN under the same call number.

For the case where the subscriber identification IMSI-F of the subscriber is registered in the home register HLR of the service unit 1, optionally the subscriber can also be assigned and transmitted automatically subscriber identifications IMSI-P from the number range of a visited communication network VPMN by the software module 2 <sic.> as soon as a location update concerning the subscriber has been received in the service unit 1 from the visited communication network VPMN. For example, this option can be specified in the home register HLR of the service unit 1 for the subscriber.

In the communication terminal 2, the data message with the subscriber identification IMSI-P from the number range of the visited communication network VPMN is received by the software module 22 and is stored in the identification module SIM as temporary subscriber identification IMSI-T. The temporary subscriber identification IMSI-T is preferably stored in a write-protected way so that it cannot be manipulated by the subscriber. The permanently stored subscriber identification IMSI-F is deactivated by the software module 22, the temporary subscriber identification IMSI-T activated, respectively. The activation, respectively deactivation, takes place, for instance, by setting, or respectively removing, flags assigned to the temporary subscriber identification IMSI-T and to the permanent subscriber identification IMSI-F in each case. The activation of the temporary subscriber identification IMSI-T, respectively the deactivation of the permanently stored subscriber identification IMSI-F, can be undone by means of user-selectable functions of the software module 22, for example. The temporary subscriber identification IMSI-T can thereby be optionally erased or left in the memory for later reactivation. Using the activated temporary subscriber identification IMSI-T, the subscriber can log himself into the visited communication network VPMN, and is then recognized by the visited communication network VPMN as a local subscriber and is entered in the home register (not shown) of the visited communication network VPMN.

As is shown in FIG. 1, cost data, for example so-called Call Detail Records (CDR), relating to connections made by means of the temporary IMSI-T, are transmitted from the visited communication network VPMN to the service unit 1 in step S3. Stored in the switching center 3 of the visited communication network VPMN, in the so-called Mobile Switching Centre (MSC), are subscriber identifications IMSI-P from the number range of the communication network VPMN which have been assigned to the operator of the service unit 1 on the basis of a partnership agreement, the subscriber identifications being assigned to an identification of the respective operator or to an identification, e.g. an address, of the respective service unit 1. The switching center 3, respectively a correspondingly programmed software module in the switching center 3, recognizes that the temporary subscriber identification IMSI-T, by means of which a connection is made, is a subscriber identification IMSI-P which has been assigned to the operator of the service unit 1, and transmits the cost data to the service unit 1. Although the subscriber in the visited communication network VPMN is logged in with a temporary subscriber identification IMSI-T from the number range of the visited communication network VPMN, the cost data can thus be transmitted to the service unit 1 whose operator is identified preferably through the permanently stored subscriber identification IMSI-F. In the service unit 1 moreover call processing fees can be billed to the requesting subscriber for the assignment of subscriber identifications IMSI-P from the number range of visited communication networks VPMN.

INDUSTRIAL APPLICABILITY

The present invention can be used for mobile radio telephony worldwide in connection with mobile radio networks, and also finds application in fixed networks in which subscribers are logged in with subscriber identifications. With the present invention it is made possible for a subscriber to log in worldwide as a local subscriber in visited communication networks, in particular in mobile radio networks.

List of Reference Symbols

| | |
|---|---|
| 1 | computerized service unit |
| 2 | communication terminal (mobile radio telephone) |
| 3 | switching center (MSC, Mobile Switching Center) |
| 11 | database |
| 12 | programmed software module |
| 21 | operating elements |
| 22 | programmed software module |
| HLR | home register (HLR, Home Location Register) |
| IMSI-F, IMSI-F' | fixed subscriber identification (Fixed International Mobile Subscriber Identity) |
| IMSI-P | subscriber identification from the partner communication network (Partner International Mobile Subscriber Identity) |
| IMSI-T | temporary subscriber identification (Temporary International Mobile Subscriber Identity) |
| MSISDN | call number (Mobile Subscriber Integrated Services Digital Network) |
| SIM | identification module (SIM, Subscriber Identification Module) |
| S1 | transmission of the service request for a subscriber identification from the number range of the visited communication network |
| S2 | transmission of the subscriber identification from the number range of the visited communication network |
| S3 | transmission of cost data |
| VPMN | visited communication network (Visited Public Mobile Network) |

The invention claimed is:

1. A telecommunication method, for logging a subscriber into a visited partner communication network (VPMN), an identification module (SIM) being connected to the communication terminal of the subscriber, in which identification module (SIM) a first subscriber identification (IMSI-F) is stored, which lies outside the number range of the visited partner communication network (VPMN), the method comprising:
    transmitting a second subscriber identification (IMSI-T), from the number range of the visited partner communication network (VPMN), from a computerized service unit, outside the visited partner communication network, to the communication terminal in the visited partner communication network (VPMN);
    storing the second participant identification (IMSI-T) in the identification module (SIM) while the communication terminal is in the visited partner communication network; and
    logging the subscriber into the visited partner communication network (VPMN) using the second subscriber identification (IMSI-T).

2. The telecommunication method according to claim 1, wherein subscriber identifications (IMSI-P) from the number range of partner communication networks (VPMN) are stored in a database of the service unit, a data message with a service request for the second subscriber identification (IMSI-T) is transmitted from the communication terminal in the visited partner communication network (VPMN) via the visited partner communication network (VPMN) to the service unit, and the second subscriber identification (IMSI-T) is taken from the database on the basis of the received service request and is transmitted via the visited partner communication network (VPMN) to the requesting communication terminal.

3. The telecommunication method according to claim 1, wherein the first subscriber identification (IMSI-F) is selected from the number range of the operator of the service unit, the first subscriber identification (IMSI-F') is stored, assigned to a call number (MSISDN), in a home register (HLR) of the service unit, and the second subscriber identification (IMSI-T) is linked in the service unit to that call number (MSISDN) which is assigned to the first subscriber identification (IMSI-F').

4. The telecommunication method according to claim 1, further comprising:
    transmitting cost data from the visited partner communication network (VPMN) to a service unit of the operator identified through the first subscriber identification (IMSI-F), the cost data being used for billing.

5. The telecommunication method according to claim 1, wherein a mobile communication terminal is used, a mobile radio network is selected as the visited partner communication network (VPMN), and mobile subscriber identifications are used as first and second subscriber identifications (IMSI-F, IMSI-T).

6. The telecommunication method according to claim 1, wherein the service request for the second subscriber identification (IMSI-T) is transmitted from the communication terminal in the visited partner communication network (VPMN) via the visited partner communication network (VPMN) to the service unit.

7. The telecommunication method according to claim 1, wherein the first subscriber identification (IMSI-F') is stored in a home register (HLR) of the service unit, the first subscriber identification (IMSI-F) is transmitted from the communication terminal to the visited partner communication network (VPMN), and upon receipt in the service unit of a location update from the visited communication network (VPMN) relating to the subscriber, the second subscriber identification (IMSI-T) from the number range of the visited partner communication network (VPMN) is automatically transmitted from the computerized service unit to the communication terminal in the visited partner communication network (VPMN).

8. An identification module (SIM) of a subscriber for use in a communication method according to claim 1, which identification module (SIM) is connectible to a communication terminal, in which identification module (SIM) a first subscriber identification (IMSI-F) is stored, which lies outside the number range of a partner communication network (VPMN), comprising:
    means for receiving a second subscriber identification (IMSI-T) from the number range of a visited partner communication network, which was received by the communication terminal in the visited partner communication network (VPMN) from a computerized service unit outside the visited partner communication network;
    means for storing the second subscriber identification (IMSI-T) in the identification module (SIM); and
    means for logging the subscriber into the visited partner communication network (VPMN) using the second subscriber identification (IMSI-T).

9. The identification module (SIM) according to claim 8, further comprising:

means for generating a data message with a service request for the second subscriber identification (IMSI-T); and means for transmitting the generated data message via the communication terminal through the visited partner communication network (VPMN) to the service unit.

10. The identification module (SIM) according to claim 8, wherein the identification module is connectible to a mobile communication terminal, and the first and the second subscriber identification (IMSI-F, IMSI-T) is a mobile subscriber identification for identifying the subscriber in a mobile radio network.

11. A computerized service unit for use in a communication method according to claim 1, which is connectible to a visited partner communication network (VPMN), comprising:

a database configured to store, subscriber identifications (IMSI-P) from the number range of visited partner communication networks (VPMN); and means for transmitting one of the subscriber identifications (IMSI-T) to a communication terminal visiting one of the visited partner communication networks (VPMN), wherein the computerized service unit is outside the visited partner communication network.

12. The computerized service unit according to claim 11, further comprising:

means for receiving data messages via partner communication networks (VPMN) from communication terminals in visited partner communication networks (VPMN), the data messages containing service requests for subscriber identifications (IMSI-T) from the number range of the respective partner communication networks (VPMN);

means for taking subscriber identifications (IMSI-T) from the database on the basis of the received service requests; and means for transmitting the taken subscriber identifications (IMSI-T) via the partner communication networks (VPMN) to the requesting communication terminals.

13. The computerized service unit according to claim 11, further comprising:

a home register (HLR) configured to store subscriber identifications (IMSI-F) from the number range of the operator of the service unit, call numbers (MSISDN) being assigned to the subscriber identifications (IMSI-F); and means for linking a subscriber identification (IMSI-T), transmitted to a requesting communication terminal, from the number range of a partner communication network (VPMN) to that call number (MSISDN) assigned to the subscriber identification (IMSI-F) from the number range of the operator, the subscriber identification (IMSI-F) identifying the requesting subscriber.

14. The computerized service unit according to claim 11, wherein the communication network (VPMN) is a mobile radio network, and the first and the second subscriber identifications (IMSI-F, IMSI-T) are each mobile subscriber identifications for identification of the subscriber in the mobile radio network.

15. The computerized service unit according to claim 11, including a home register (HLR) in which subscriber identifications (IMSI-F') from the number range of the operator of the service unit are stored, and further comprising:

means for receiving location updates relating to communication terminals in the visited partner communication networks (VPMN) via the partner communication networks (VPMN); and means for transmitting automatically subscriber identifications (IMSI-T) from the number range of visited partner communication networks (VPMN) via the partner communication networks (VPMN) to respective communication terminals in the visited partner communication networks (VPMN) upon receipt of location updates for respective communication terminals.

* * * * *